United States Patent
Osborn

(10) Patent No.: US 7,539,871 B1
(45) Date of Patent: May 26, 2009

(54) SYSTEM AND METHOD FOR IDENTIFYING MESSAGE PROPAGATION

(75) Inventor: Kevin G. Osborn, Newton, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 773 days.

(21) Appl. No.: 10/784,587

(22) Filed: Feb. 23, 2004

(51) Int. Cl.
H04L 9/00 (2006.01)

(52) U.S. Cl. ............... 713/176; 713/168; 713/170; 380/246; 380/270

(58) Field of Classification Search ............... 713/176, 713/188, 170, 179, 180, 181; 340/5.1, 5.53; 726/22, 24; 709/202, 223; 380/246; 705/69
See application file for complete search history.

(56) References Cited

U.S. PATENT DOCUMENTS

| | | | | |
|---|---|---|---|---|
| 5,349,655 A * | 9/1994 | Mann | ............... | 714/6 |
| 5,408,642 A * | 4/1995 | Mann | ............... | 714/38 |
| 5,530,757 A * | 6/1996 | Krawczyk | ............... | 713/188 |
| 5,623,600 A * | 4/1997 | Ji et al. | ............... | 726/24 |
| 5,889,943 A * | 3/1999 | Ji et al. | ............... | 726/22 |
| 6,052,709 A * | 4/2000 | Paul | ............... | 709/207 |
| 6,393,465 B2 * | 5/2002 | Leeds | ............... | 709/207 |
| 6,615,348 B1 * | 9/2003 | Gibbs | ............... | 713/162 |
| 6,757,830 B1 * | 6/2004 | Tarbotton et al. | ............... | 713/188 |
| 6,873,988 B2 * | 3/2005 | Herrmann et al. | ............... | 707/10 |
| 6,886,099 B1 * | 4/2005 | Smithson et al. | ............... | 726/24 |
| 6,898,715 B1 * | 5/2005 | Smithson et al. | ............... | 726/24 |
| 7,093,239 B1 * | 8/2006 | van der Made | ............... | 717/135 |
| 7,124,305 B2 * | 10/2006 | Margolus et al. | ............... | 713/193 |
| 7,231,667 B2 * | 6/2007 | Jordan | ............... | 726/23 |
| 2003/0212902 A1 * | 11/2003 | van der Made | ............... | 713/200 |
| 2004/0168085 A1 * | 8/2004 | Omote et al. | ............... | 713/201 |
| 2004/0172551 A1 * | 9/2004 | Fielding et al. | ............... | 713/200 |
| 2007/0220608 A1 * | 9/2007 | Lahti et al. | ............... | 726/24 |

* cited by examiner

Primary Examiner—Kimyen Vu
Assistant Examiner—April Y Shan
(74) Attorney, Agent, or Firm—Brooks Kushman, P.C.

(57) ABSTRACT

Conventional virus detection software monitors incoming arrivals of network traffic. Retroactive analysis and/or monitoring of previously accepted traffic is not included in the scope of protection. A retroactive virus detection and propagation history tracking mechanism provides identification of successive recipients of a newly discovered virus which may have eluded detection during the lag time prior to effecting the detection of a new virus. A propagation history maintains a set of recipients receiving a potentially harmful transmission. Upon detection of a particular transmission or portion thereof as being a virus, the propagation history contains a set of infected recipients, which the tracking mechanism notifies so as to perform remedial action and contain the virus to the known set of infected recipients. In this manner, configurations of the invention maintain a set of successive recipients of a virus, and retroactively track and contain the newly propagated virus once detected.

11 Claims, 6 Drawing Sheets

SYSTEM AND METHOD FOR IDENTIFYING MESSAGE PROPAGATION

BACKGROUND OF THE INVENTION

Conventional computer networks are susceptible to attacks from malicious transmissions such as viruses, worms, and Trojan horses. Such malicious transmissions infiltrate a user computer system and perform an undesirable operation, such as deleting files, consuming excessive resources, or causing other undesired operation. A common trait of many conventional viruses is to replicate the virus itself to other computer systems in communication with the already infected computer system. Often, just as with biological viruses, a computer virus operates as a dormant carrier, "infecting," or replicating itself to other computer systems without manifesting symptoms on the carrier host. In this manner, a virus is likely to infect many more systems prior to detection and elimination than if the virus was readily apparent to a user.

Conventional viruses often employ email as a propagation vehicle for replication. Conventional email provides a widely available and installed base of software for transmitting and receiving to other computer systems. Often, email also provides a seamless way to execute components of the email as live code. Such conventional email systems employ attachments as a convenient method of incorporating distinct components of varying types into the conventional email message. Accordingly, an unsuspecting user operating with an unprotected email system provides an easy target for such a malicious transmission

SUMMARY

Modern conventional software systems employ virus detection applications which detect and eliminate harmful transmissions such as those containing viruses, worms, Trojan horses, and other types of harmful and/or malicious transmissions. Conventional off-the-shelf (OTS) virus detection software typically scans for such undesirable transmissions by matching against a set of known harmful transmissions. Typically, such conventional matching includes comparing a signature or other digital artifact, which provides a unique fingerprint specific to a particular virus, to incoming mail messages. The fingerprint is a computed or extracted value (e.g. a string or binary sequence present in, or determined from, the code of the virus) which is smaller than the actual virus yet which is indicative of existence of the virus due to statistical unlikelihood of recreating the fingerprint from other than the actual virus. The conventional virus detection application also computes a signature for portions of incoming messages for comparison, such that message portions yielding a similar fingerprint are deemed to be harmful.

Such conventional virus detection applications, therefore, employ a set of known virus fingerprints for comparison with incoming mail messages. The set contains a fingerprint for each known virus which the application is to protect against, and the application compares each fingerprint in the set to suspect message portions. Typically, vendors of such conventional virus detection applications provide periodic updates including additions to the fingerprint set of known viruses. These additions result from detection of new viruses, and decomposition of the new viruses to compute an appropriate fingerprint for use by the virus detection application. However, one problem is that such new viruses enjoy a period of largely unrestricted propagation pending detection and fingerprint generation for combating the virus. During this lag time between virus inception and incorporation into the virus detection application, the virus may propagate among many users.

The present invention is based, in part, on the observation that typical conventional virus detection software monitors incoming arrivals of network traffic. Retroactive analysis and/or monitoring of previously accepted traffic is not included in the scope of protection. Further, conventional approaches do not maintain a propagation history or other indication of successive dissemination of a potentially harmful transmission, such as other users to whom the recipient forwards the message. Therefore, remedial action or other mitigation against a harmful or undesirable transmission is difficult. Accordingly, conventional virus detection software implementations may not effectively contain new viruses during the lag time between inception of the virus and effectuation of the detection fingerprint in the user computer system.

Particular configurations of the invention substantially overcome the above-described shortcomings of conventional virus detection mechanisms by effecting a retroactive virus detection and propagation history tracking mechanism. The detection and tracking mechanism provides identification of successive recipients of a newly discovered virus which may have eluded detection during the lag time prior to effecting the detection fingerprint corresponding to the virus. A propagation history maintains a set of recipients receiving a potentially harmful transmission. Upon detection of a particular transmission or portion thereof as being a virus, the propagation history contains a set of infected recipients, which the tracking mechanism notifies so as to perform remedial action and contain the virus to the known set of infected recipients. In this manner, configurations of the invention maintain a set of successive recipients of a virus, and retroactively track and eliminate the newly propagated virus once detected, mitigating the conventional epidemic period which results during the lag time for integrating and effecting the detection fingerprint into the conventional virus detection applications.

In further detail, the propagation history allows tracking of incoming transmissions such as mail messages for limiting the dissemination of computer viruses by identifying an incoming transmission including at least one identifiable portion, and computing, a fingerprint indicative of the identified portion for each identifiable portion in the incoming transmission. The fingerprint, such as a digital signature, is a data item substantially unique to the identified portion and operable for identification of a similar portion. A mail server stores the computed fingerprint to generate a set of stored fingerprints in a repository. The mail server subsequently receives a set of comparison fingerprints corresponding to known portions, such as a virus signature update, in which the comparison fingerprints (i.e. virus fingerprints, or signatures) are predetermined by the virus detection application vendor or other source. The mail server comparing the stored fingerprints to the comparison fingerprints in the virus detection update to identify stored fingerprints (i.e. incoming messages) matching comparison fingerprints (i.e. known viruses) and, if a match is found, identifying the previously received incoming transmission corresponding to the matching stored fingerprint.

In the exemplary configurations illustrated, the mail server selectively stores fingerprints (i.e. signatures) corresponding to the identifiable portions of the incoming transmission depending on whether the incoming transmission corresponds to the initial matching with the comparison fingerprints. In other words, the mail server initially attempts to match incoming mail messages against the fingerprint set of known virus fingerprints. If no match is found, the mail server stores the fingerprint of the incoming messages for comparison with a later revised set of known virus fingerprints. Computing the fingerprint value typically involves determining a signature, or hash value, and comparing comprises signature matching with the set of stored virus signatures (fingerprints). The comparison fingerprints are, therefore, virus signatures computed from known undesirable transactions. Alternatively, less computationally intensive fingerprint mechanisms may be employed, for example if signature generation capability imposes an undue processing burden. Such mechanisms may include direct string extraction of a segment (particularly for executable files), storage of an entire portion, or other less computationally intensive mechanism.

When the mail server receives a successive set of comparison fingerprints, the server compares the successive sets of comparison fingerprints to the stored fingerprints. Any suitable pattern matching mechanism may be employed, such as a database traversal, binary comparison, or other pattern recognition search. If a match is found, the mail server identifies a distribution set of the incoming message corresponding to the matching stored fingerprint. The mail server then transmits an indication of the match to the distribution set of recipients which to which the message server has disseminated the message or portions thereof.

In the exemplary email context, following retroactive determination of a propagating virus in a disseminated mail message, the subsequent disposition includes transmitting an indication of the undesirable incoming transmission to a list of successive recipients. The detected incoming transmissions include a series of potentially harmful network transmissions, in which each of the incoming transmission is operable to include malicious code. Such subsequent disposition includes delivery to at least one successive recipient and remedial action includes determining the successive recipients from the stored successive disposition and notifying each of the successive recipients. In this manner, the mail server selectively performs, based on the determining, a remedial action in response to the subsequent disposition. Such remedial action includes, at a minimum, informing the successive recipients of the virus or other harmful nature of the messages, and may also include other remedial actions.

Typically, the determined undesirable portions do not indicate an undesirable transmissions based on the comparing of a previous sets of comparison fingerprints since it presumably has already passed the previous virus check employing the previous set of comparison fingerprints (i.e. virus checking signature updates). Such propagation may be particularly harmful since the undesirable transmission has already been "blessed" as benign by the earlier virus check. However, in a typical conventional mail server, information about the post virus check transport of the undesirable message is not readily available.

In the exemplary configuration, the repository stores the successive dissemination, or transport, of the message as a set of entries in a disposition reference table. The mail server demarcates the incoming transmission into segments, each operable to yield a fingerprint, in which comparing further comprises comparing each value in the set of comparison fingerprints with at least one of the fingerprints computed from the segments. A segmenter in the mail server identifies a segment type of each incoming segment, in which segment type corresponds to the content included in the segment. The segmenter then categorizes each of the segments according to a risk analysis heuristic, in which the heuristic is indicative of a likelihood of the categorized segment having an undesirable portion (i.e. being "infected").

The invention as disclosed above is described as implemented on a computer having a processor, memory, and interface operable for performing the steps and methods for monitoring and processing events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Conventional virus detection applications employ a set of known virus fingerprints for comparison with fingerprints of incoming mail messages suspected of potentially carrying a virus. The fingerprint set contains a fingerprint for each known virus which the application is to protect against, and the application compares each fingerprint in the set to the fingerprint of suspect message portions. Typically, vendors of such applications provide periodic updates including additions to the fingerprint set of known viruses. These additions result from detection of new viruses, and decomposition of the new viruses to compute an appropriate fingerprint for use by the virus detection application. However, the new viruses may enjoy a period of largely unrestricted propagation pending detection and fingerprint generation, by the vendor, for combating the virus. During this lag time between virus inception and incorporation into the virus detection application, the virus may propagate among many users.

Accordingly, configurations of the invention address the shortcomings of typical conventional virus detection software which monitors an access point for incoming arrivals of network traffic. In such conventional applications, retroactive analysis and/or monitoring of previously accepted traffic is not included in the scope of protection because conventional approaches do not maintain a propagation history or other indication of successive dissemination of a potentially harmful transmission. Therefore, remedial action or other mitigation, such as notification of successive recipients of an infected message, is difficult. Accordingly, conventional virus detection software implementations may not effectively contain new viruses during the lag time between inception of the virus and effectuation of the detection fingerprint in a user computer system.

The exemplary configuration described below substantially overcomes shortcomings of conventional virus detection mechanisms by effecting a retroactive virus detection and propagation history tracking mechanism. The detection and tracking mechanism provides identification of successive recipients of a newly discovered virus which may have eluded detection during the lag time prior to implementation of the detection fingerprint corresponding to the virus. A propagation history maintains a set of recipients receiving a potentially harmful transmission. Upon detection of a particular transmission or portion thereof containing a virus, the propagation history contains a set of infected recipients, which the tracking mechanism notifies so as to perform remedial action to limit the virus to the known set of infected recipients. In this manner, configurations of the invention maintain a set of successive recipients of a virus, and retroactively track the newly propagated virus once detected, now described in further detail.

Figure 1:
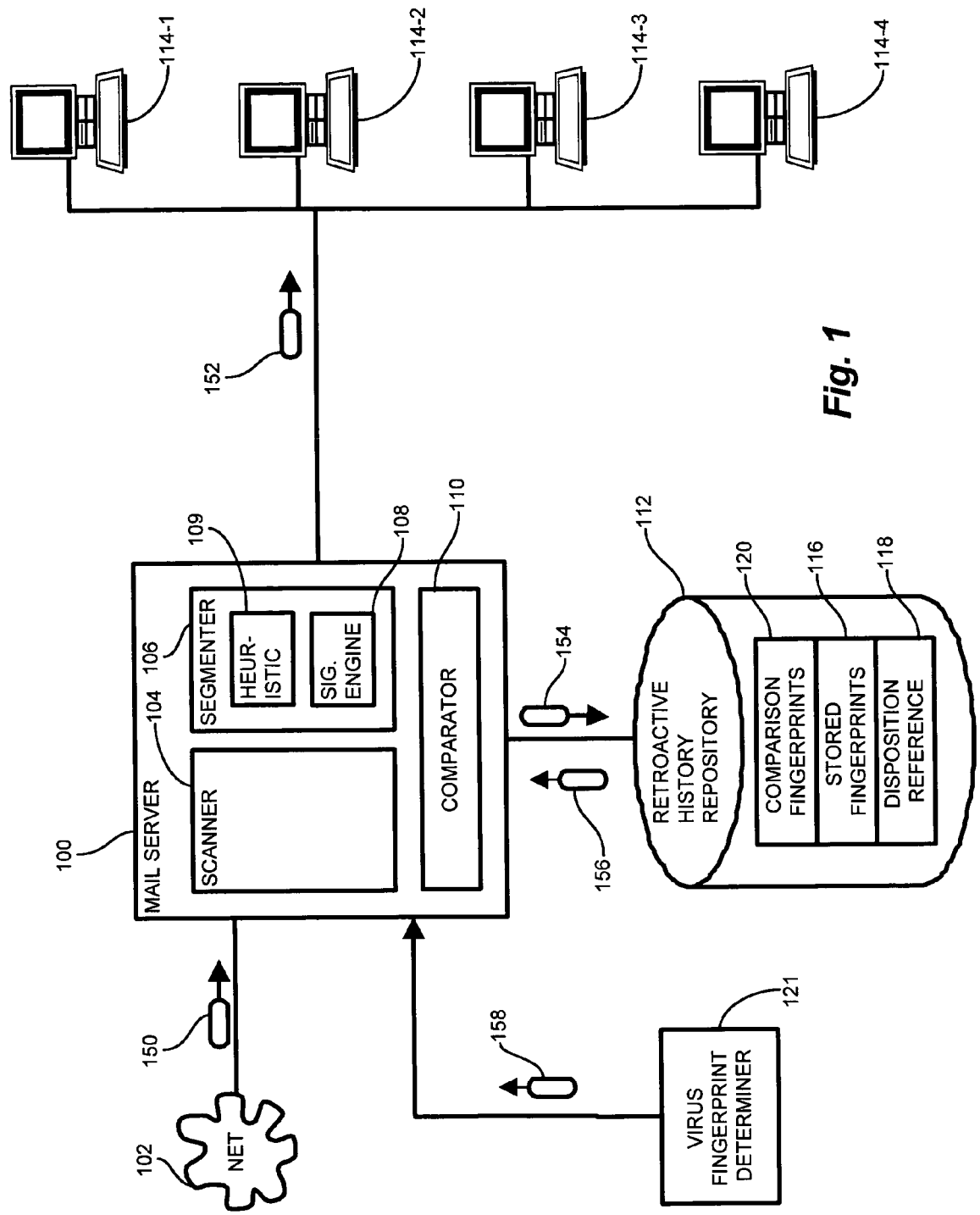
FIG. 1 is a block diagram of a mail server data communications device suitable for use with the present invention.

FIG. 1 is a block diagram of a data communications device suitable for use with the present invention in greater detail. Referring to FIG. 1, a mail server 100 couples to a public access network 102 such as the Internet and is operable to receive incoming message traffic 150 therefrom for forwarding to users 114-1.114-4 (114 generally). The mail server 100 includes a scanner 104 and a segmenter 106. The scanner 104 is operable to read the incoming message traffic 150 and identify mail messages or other transmissions potentially including harmful transmissions, such as viruses. The segmenter 106 is operable to recognize portions, or segments, of the incoming transmissions 150 which may contain a virus. The segmenter 106 includes a signature engine 108, operable to compute a signature or other fingerprint of the recognized portions.

The mail server 100 further includes a comparator 110 and connects to a retroactive history repository (repository) 112 for storing the fingerprints 116. The repository 112 also includes comparison fingerprints 120 and a disposition reference 118 containing successive recipients (users) 114 of the incoming messages 152. A virus fingerprint determiner 121 determines and transmits updates of known virus fingerprints 158 to the mail server 100, for comparison with the stored fingerprints 116. In the exemplary configuration, the fingerprint determiner 121 represents a developer/distributor of virus detection software. Upon receipt of a fingerprint update 158, the mail server retrieves 156 the stored fingerprints 116 for comparison with the update 158. If the comparator 110 determines a match between the stored fingerprint 156 and the update 158, the mail server 100 identifies the disposition reference 118 corresponding to the matched stored fingerprint 116 to pursue remedial action, as will now be described in further detail.

Figure 2:
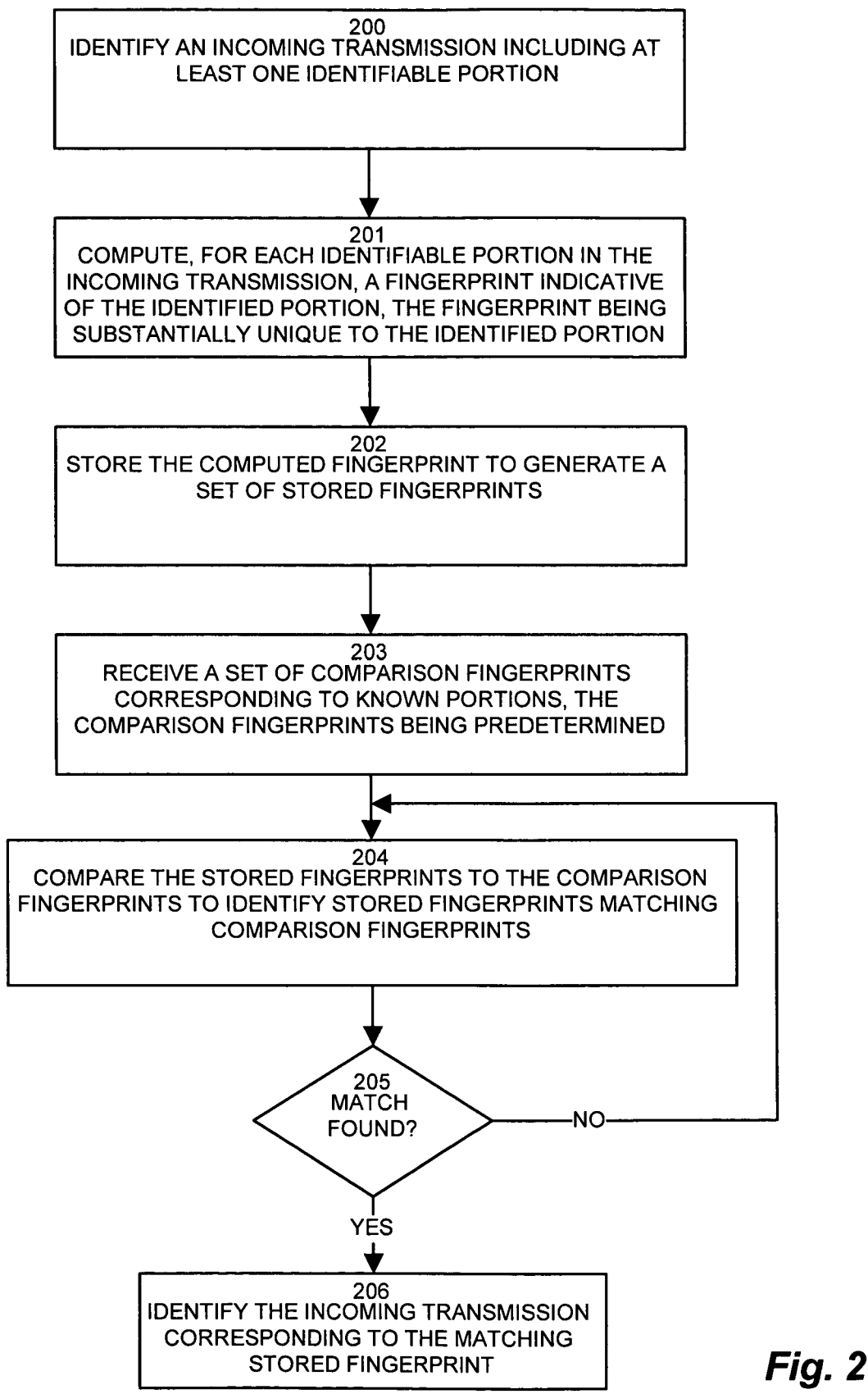
FIG. 2 is a flowchart of the system of the present invention.

FIG. 2 is a flowchart of the system of the present invention. Referring to FIGS. 1 and 2, the method of tracking incoming transmissions 150 as claimed herein includes identifying, via the scanner 104, an incoming transmission 150 including at least one identifiable portion (132, discussed below), as depicted at step 200. The incoming transmission 150 is typically an incoming mail message, as email attachments are a common method for attempting virus propagation. Typically, such an undesirable email transmission includes one or more attachments which contain the virus or other undesirable transmission. Such email attachments provide a vehicle for executing code responsive to the user's attempt to open the attachment, as is common with graphic attachments which invoke a graphical display application. Accordingly, email attachments are a convenient mechanism for luring an unsuspecting user to execute malicious code. However, other mechanisms for propagating viruses exist, such as HTTP references and direct file references, if other security parameters such as access lists and privileges allow such references.

For the identified incoming transmissions 150, the segmenter 106 receives the scanned portions 132 and computes, for each identifiable portion in the incoming transmission, a fingerprint indicative of the identified portion, the fingerprint being substantially unique to the identified portion, as shown at step 201. The fingerprint is a mathematical computation, typically a hash such as MD4, MD5 or SHA, which is unlikely to yield the same value for a dissimilar message portion 132. Such signatures are well known to those of skill in the art, and may also involve other mechanisms, such as the older checksums and parity, or other computation which is smaller than the data item it represents yet which is unlikely to be duplicated by a different data item, and therefore an accurate indicator of the underlying data item. As indicated above, alternative fingerprint mechanisms may also be employed, such as string extraction of a segment (particularly for executable files) or other less computationally intensive mechanism.

The mail server 100 stores the computed fingerprint to generate a set of stored fingerprints 116, as depicted at step 202. The repository 112 retains the fingerprints 116 for comparison with newly discovered viruses, described below. At a successive point in time, the virus fingerprint determiner 121 sends a set of predetermined comparison fingerprints 158 corresponding to known portions 132, for receipt by the mail server 100 and storage as comparison fingerprints 120, as shown at step 203. As described above, typical virus detection applications generate periodic updates covering newly discovered viruses and other harmful or undesirable transmissions. The mail server retrieves 156 the stored fingerprints 116 into the comparator 110, to compare the stored fingerprints 116 to the comparison fingerprints 120 to identify stored fingerprints 116 matching comparison fingerprints 120, as depicted at step 204. A check is performed at step 205, and, if a match is found, the mail server 100 identifies the previously received incoming transmission 150 corresponding to the matching stored fingerprint, 116 by referencing the disposition reference 118, as depicted at step 206. The disposition reference 118 stores successive recipients of the message 150, such as through forwarding and replies, as well as other attributes (fields) for ascertaining the propagation of the virus contained in the undesirable transmission (message).

Therefore, the mail server 100 stores the propagation history, including later recipients of the infected message, so that when a virus detection vendor issues an update 158 to a current set of virus fingerprints stored in the repository 112 as comparison fingerprints 120, earlier messages 150 which may have included a virus are checked retroactively. In this manner, a virus which eludes detection in an earlier set of comparison fingerprints 120 is detected in a successive set of updates 158, thereby covering the lag time window between virus detection and fingerprint implementation.

Figure 3:
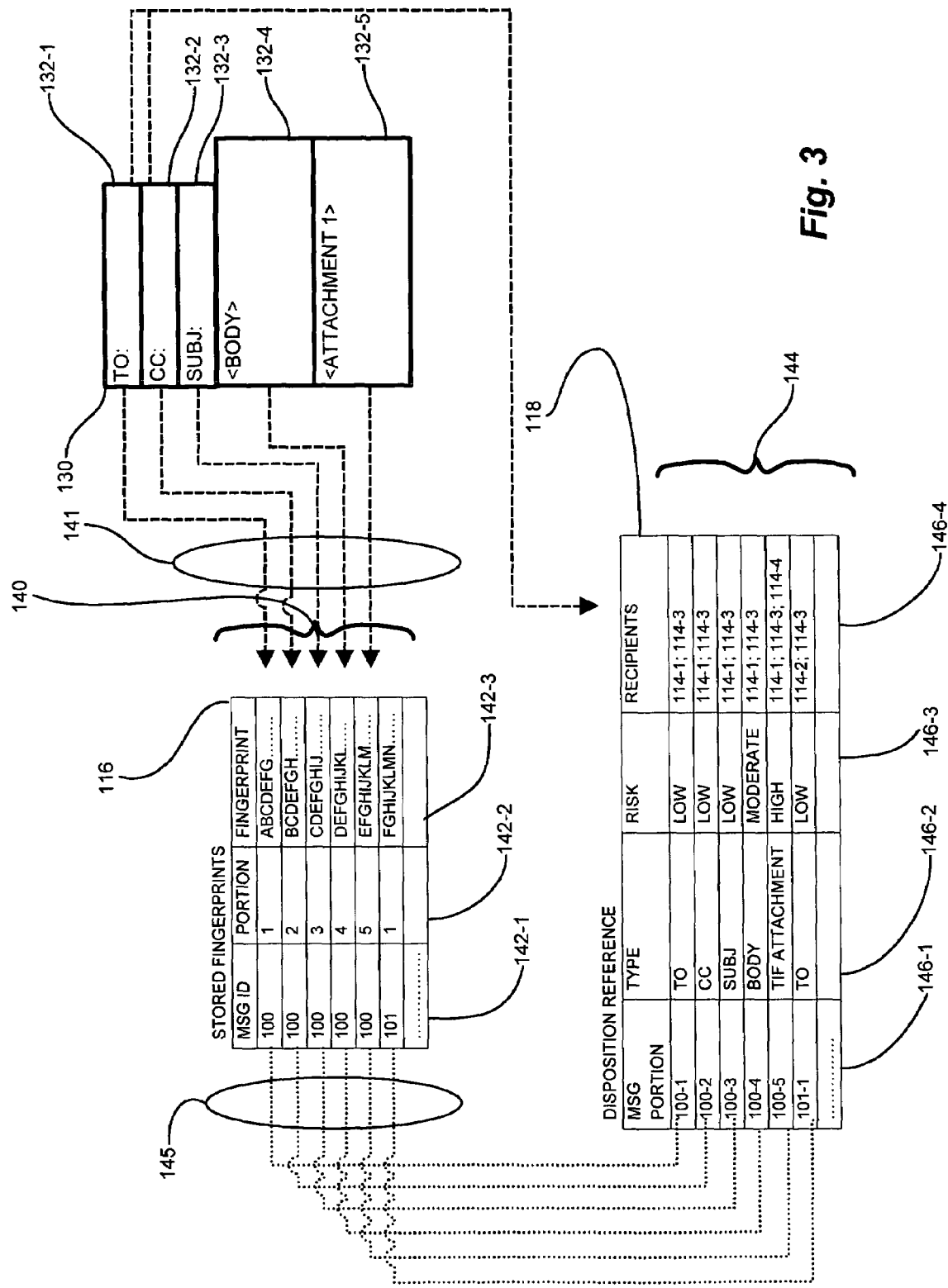
FIG. 3 is a propagation disposition table and stored fingerprint table indicative of propagation history of a particular message portion.

FIG. 3 is an exemplary propagation disposition table indicative of propagation history of a particular email message 130 and message portions 132-1 . . . 132-5 (132 generally) therein, according to a particular configuration. Referring to FIGS. 1 and 3, an exemplary message 130 includes the message portions 132 over which the signature engine 108 computes the fingerprints 142-3 in the stored fingerprints 116 table. Each of the message portions 132-1.132-5 corresponds to a particular field 132-1 . . . 132-5 in the email message 130, as indicated by arrows 141. The email 130 shown is exemplary, and may include additional fields, attachments, and/or may omit certain fields shown. Fingerprints corresponding to multiple emails are operable for storage in the stored fingerprints 116 table. The repository 112 arranges the fingerprints 116 in entries 140, each of which includes a message identification 142-1 and a portion identification 142-2, in addition to the computed fingerprint 142-3. For each entry 140 in the stored fingerprints, the disposition reference 118 in the repository 112 includes entries 144 including attributes 146 indicative of the dissemination of a particular portion 132 of the incoming message 150, as shown by dotted lines 145. Note that the granularity of the table 118 may also be simply the entire message 130, however different portions 132, such as certain attachments 132-5, may be more at risk for including a virus, as will now be described further.

In the exemplary configuration shown, the disposition reference table 118 includes the entries 144 corresponding to message portions 132 of the stored fingerprints 116. The disposition reference 118 table stores the message portion 132 attributes 146 and include the message recipients 146-4, including users 114, portion 146-1, type 146-2, and risk 146-3. For each identified portion 132, the stored fingerprints 116 stores the fingerprint 142-3, and the recipients attribute 146-4 stores the users to whom the message portion 132 has been subsequently delivered, obtained from the TO: and CC: portions 132-1, 132-2, respectively, of the incoming email message 130.

Since certain message portions 132 may be more suspect, and therefore at a higher risk, of containing a virus, the type and risk attributes 146-2, 146-3, respectively, provide information allowing a determination based on such risk. For example, a particular approach may elect to limit scrutiny to attachments, or to attachments of a particular type 146-2 or risk value 146-3. As indicated above, attachments are a popular virus transport vehicle because of their ability to be executed easily by the recipient user.

In the event a subsequent determination identifies a virus containing message portion 132, the matched fingerprint 142-3 identifies the message 142-1, and a traversal of the related portions 132 in the disposition reference 118 provides the recipients 146-4 receiving the infected portion 132. Note that it is typical that an entire message 130 may be forwarded, including all portions, however individual portions 132 are individually extractable and may be subject to disposition independently of other portions 132 from the same message 130.

Figure 4:
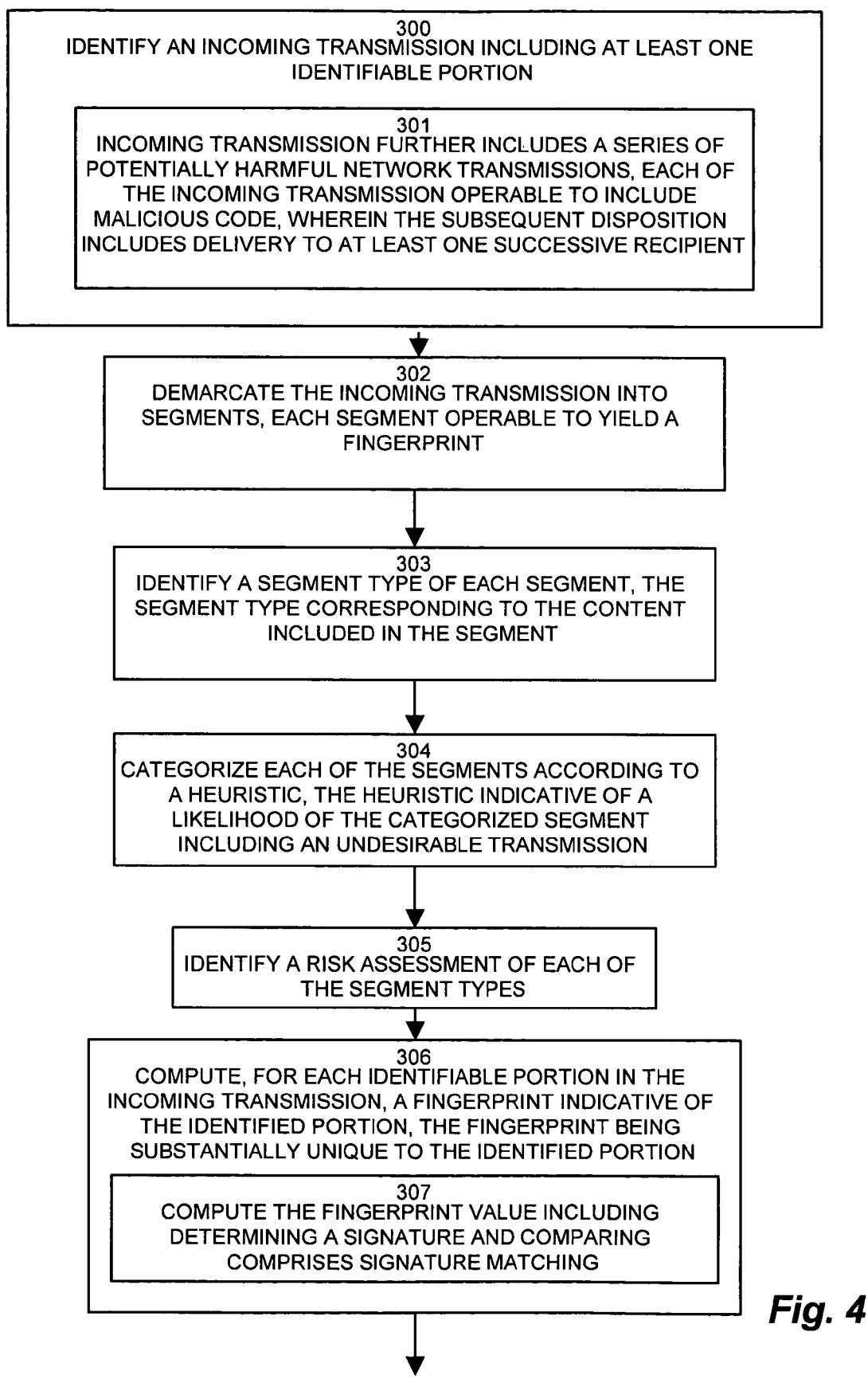
FIGS. 4-6 are a flowchart of a particular configuration of the invention of FIG. 1 in greater detail.
Figure 5:
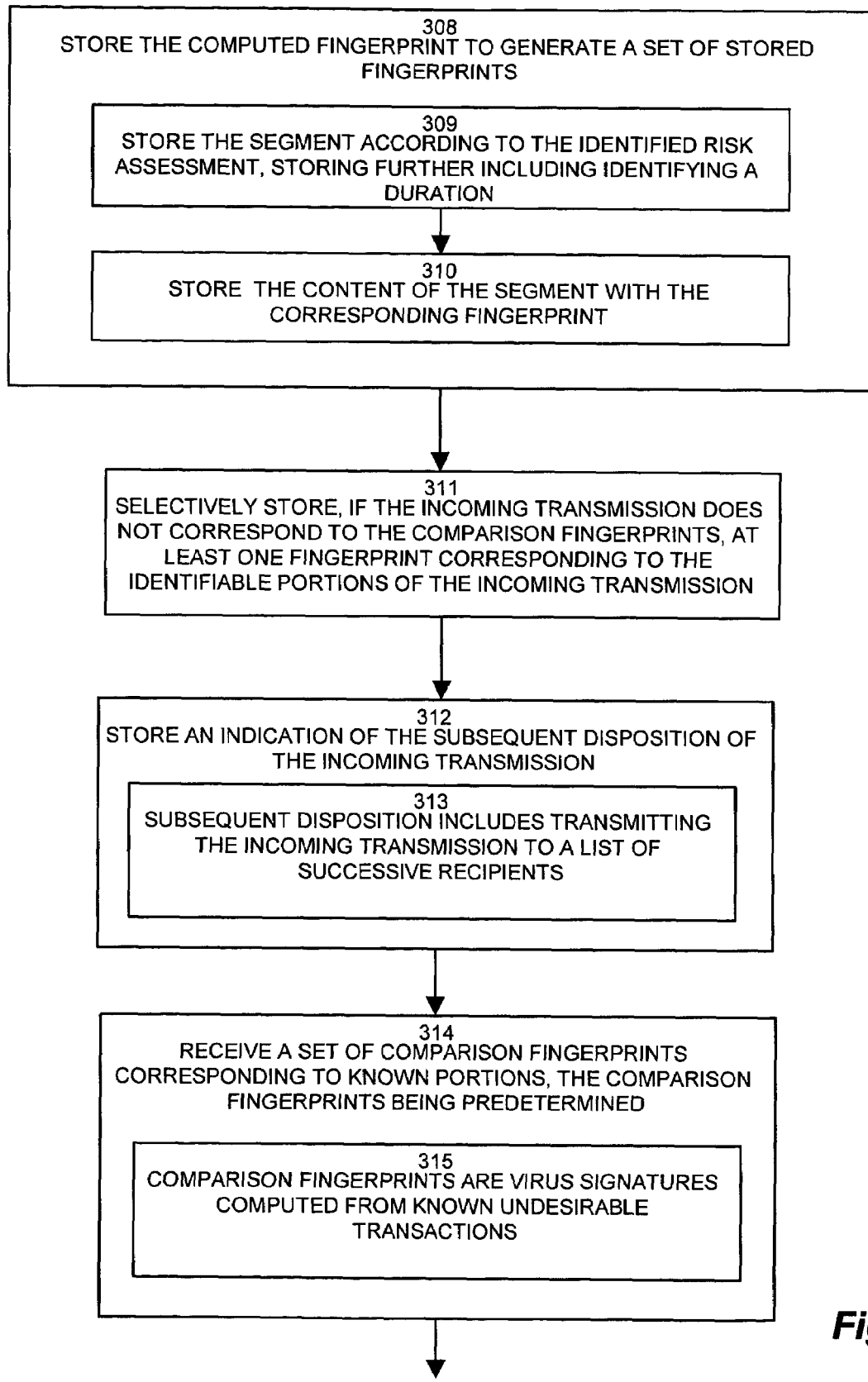
Figure 6:
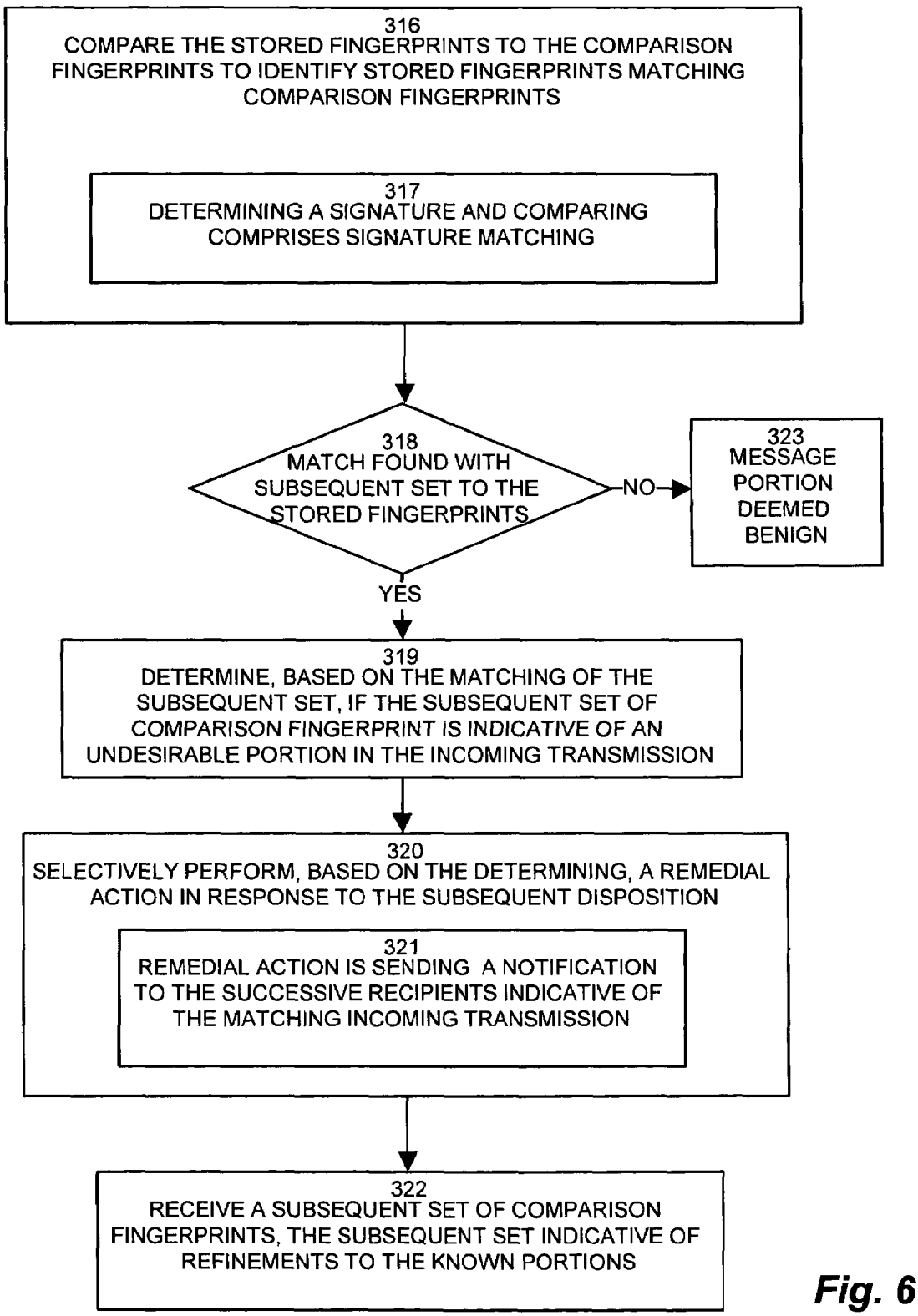

FIGS. 4-6 are a flowchart of a particular configuration of the invention discussed in FIGS. 1 and 3 in greater detail. Referring to FIGS. 1 and 3-6, the scanner 104 in the mail server 100 identifies an incoming transmission including at least one identifiable portion, as depicted at step 300. The scanner is configured to particularly scan for incoming transmissions which may include a series of potentially harmful network transmissions, such as emails from unknown sources, in which each of the incoming transmission is operable to include malicious code. Typically the scanner would monitor a particular port or other common access point through which email passes, although other access points, such as HTTP or direct file access points, may be scanned as well. In particular, the scanner observes messages 132 for which subsequent disposition may include delivery to one or more successive recipients, in which remedial action includes determining the successive recipients from the stored successive disposition and notifying each of the successive recipients of the determined harmful nature of the incoming transmission (message) 130.

The scanner 104 passes the scanned message 130 to the segmenter 106 enabling the segmenter 106 to demarcate the incoming transmission into segments, or portions 132, each segment operable to yield a fingerprint, as disclosed at step 302. The segmenter 106 then identifies a segment type 146-2 of each segment 132 which corresponds to the content included in the segment, such as the body, TO: or CC: fields, or attachments of a particular type 146-2, as depicted at step 303. Attachment type is particular salient because certain attachment types, such as graphical content, are operable to be executed immediately upon user demand.

The segmenter 106 then categorizes each of the segments 132 according to a heuristic 109, in which the heuristic is indicative of a likelihood of the categorized segment including an undesirable transmission, as shown at step 304. Such a heuristic 109 may indicate, for example, certain types likely to contain viruses, or certain types which need not burden the repository 112 because of an unlikelihood or inability to contain malicious executable code. At step 305, therefore, the segmenter 106 identifies a risk assessment of each of the segment types 146-2 according to the heuristic 109. The heuristic 109 may also include a time duration value associated with each segment to indicate how long the repository 112 is to retain the fingerprint 142-3 corresponding to the segment 132. Over time, the likelihood of a yet undiscovered virus occurring diminish, and elimination of fingerprints less likely to evoke a remedial action may conserve space and improve efficiency.

The segmenter 106 invokes the signature engine 108 to compute, for each identifiable portion (segment) 132 in the incoming transmission 150, a fingerprint indicative of the identified portion 132, in which the fingerprint 142-3 is substantially unique to the identified portion 132, as depicted at step 306. In the particular exemplary configuration, computing the fingerprint value 142-3 includes determining a signature operable for subsequent comparing including signature matching, as disclosed at step 307. Such signature generation techniques are well known to those of skill in the art, and include hashing operations such as SHA, MD4, and MD5, to name several. However, alternate computation mechanisms for computing a value such as a parity or checksum value which is smaller than the source value yet which is unlikely to be repeated for other than the particular source value may also be employed.

The mail server 100 stores the computed fingerprints 154 to generate a set of stored fingerprints 116 in the repository 112, as depicted at step 308. Note that a check of the fingerprints against currently known fingerprints 120 may also occur, however the computed fingerprints are still included in the stored fingerprints 116 for protection from yet undetected viruses. At step 309, the repository 112 optionally stores the segment 132 according to the identified risk assessment, in which storing further including identifying a duration. As indicated above, the risk assessment may indicate little or no risk for certain portions 132, and inclusion in the stored fingerprints 116 occurs accordingly. Further, if sufficient storage space is available in the repository 112, storage of the segments may include storing the actual content of the segment 132 with the corresponding fingerprint, as depicted at step 310. Storage of the actual content allows more precise comparison and also provides a source from which to disassemble the portion for determining a fingerprint 142-3, as typically performed in the fingerprint determiner 121.

As indicated above, for message portions 132 which do not yield a positive virus infection upon arrival, via the conventional virus checking mechanism, storing further includes selectively storing, if the incoming transmission 150 does not correspond to (i.e. match) the comparison fingerprints 120, then the mail server 100 stores at least one fingerprint 142-3 corresponding to the identifiable portions 132 of the incoming transmission 150, as depicted at step 311. In such instances, the virus checking occurs as a two phase process. The first check occurs upon initial delivery, after which the fingerprints 142-3 of the messages portions 132 reside in the stored fingerprints 116. The second check occurs upon later receipt of a set 158 of comparison fingerprints 120 which indicates a virus in the earlier received portion represented in the stored fingerprints 116.

At step 312, the disposition reference 118 stores an indication of the subsequent disposition of the incoming transmission 150, as shown at step 312. At step 313, such subsequent disposition includes transmitting the incoming transmission 150 to a list of successive recipients. Email messages typically propagate (i.e. are delivered) according to the TO: and CC: fields, which are a list of email recipients 146-4. Further, typical email applications facilitate forwarding and replying to the message employing such a recipient list. Accordingly, traversal of the subsequent TO: and CC: fields of forwarded and replied to messages is indicative of message propagation.

At some later time, after having delivered the incoming message to the intended user 114 recipients 146-4, the mail server 100 receives a set 158 of comparison fingerprints 120 corresponding to known portions 132, in which the comparison fingerprints 120 are predetermined by the virus fingerprint determiner 121, as shown at step 314. Accordingly, at step 315, such received comparison fingerprints 120 are virus signatures computed from known undesirable transactions. In the typical exemplary configuration, the set 158 of comparison fingerprints 120 is an update from a virus detection software distributor/manufacturer which periodically distributes new additions to the set of known virus signatures. This revised set of virus fingerprints represents viruses which may have been previously distributed through the mail server 100 as benign messages since they were not detected as virus-containing by the previous set of comparison fingerprints 120.

The comparator 110 receives the updated set 158 of comparison fingerprints 120, and compares the stored fingerprints 116 to the updated comparison fingerprints 120 to identify stored fingerprints 116 matching the comparison fingerprints 120, as depicted at step 316, for successive identification of the previous incoming transmission 150 corresponding to the matching stored fingerprint. At step 317, the comparator 110 compares each value in the set of comparison fingerprints 120 with at least one of the segments (portions) 132 of the incoming messages 150 via signature matching between the fingerprints in the subsequent set 158 to the stored fingerprints 116. The mail server performs a check, as depicted at step 318, to determine a match. Accordingly, the mail server determines, based on the matching of the subsequent set, if the subsequent set of comparison fingerprint is indicative of an undesirable portion in the incoming transmission, as indicated at step 319.

If no match is found at step 318, then the incoming message is deemed benign and allowed to pass to the recipients 114 as an unhindered email 152.

Based on the determination of step 319, the mail server 100 selectively performs a remedial action in response to the subsequent disposition of the infected message portions 132, as shown at step 320. In the exemplary configuration illustrated, the remedial action includes sending a notification to the successive recipients 114 indicative of the matching incoming transmission 150, as depicted at step 321, although other actions may occur. Typically, the determined undesirable portion 132 did not indicate undesirable transmissions based on the comparing of a previous set of comparison fingerprints 120. In other words, the undesirable portion 132 is a newly discovered virus. Alternative remedial actions include sending messages to remote mail servers to which the message server 100 sent the infected portions 132. In still other extensions to the exemplary configuration, the portion 132 may not be undesirable, however the message tracking of the disposition reference 118 employed to determine the dissemination of the message for tracking or other purposes.

Such message tracking may be valuable as a journaling tool, to identify and track changes and dissemination to an email or a branching succession of emails emanating from an initial email. Such a mechanism may be useful in verifying receipt of and additions made to a particular email. Regulatory and compliance issues, such as tracking employee usage of company email for personal items, or as an evidentiary tool for assessing contributions to illegal, negative or harassing content, for example.

Additional updates to the comparison fingerprints 120 typically arrive according to a periodic update schedule. Accordingly, the mail server 100 receives a successive set of comparison fingerprints, and iteratively compares the successive sets 158 of comparison fingerprints 120 to the stored fingerprints 116 in an ongoing manner according to the update schedule. In each such update distribution, if a match is found, the mail server 100 identifies the distribution set 146-4 of the incoming message 150 corresponding to the matching stored fingerprint and transmits an indication of the match to the recipients 114 in the distribution set, as depicted at step 322. Control then reverts to step 316 as above for processing each of the successive updates 158. In this manner, the stored fingerprints 116 provide an ongoing, discrete repository for identifying and tracking the successive disposition of formerly benign messages 152 later determined to contain undesirable content.

It should be noted that the undesirable portions discussed above as exemplary segments 132 of incoming email messages include viruses, worms and Trojan horses, as well as other code and/or data fragments intended to cause undesirable operation of the recipient computer system 114. Typically such portions 132 employ an email attachment for transport, although such transport should not be taken as limiting of the invention.

Those skilled in the art should readily appreciate that the programs and methods for maintaining a propagation history of potentially harmful network transmissions as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for maintaining a propagation history of potentially harmful network transmissions has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of tracking incoming transmissions comprising:
    identifying an incoming transmission including at least one identifiable portion;
    computing, for each identifiable portion in the incoming transmission, a fingerprint indicative of the at least one identified portion, the fingerprint being substantially unique to the at least one identified portion;
    storing the computed fingerprint to generate a set of stored fingerprints in a hardware implemented mail server;
    receiving at the hardware implemented mail server a set of comparison fingerprints corresponding to a known portion of the incoming transmission, the set of comparison fingerprints being predetermined;
    comparing at the hardware implemented mail server the set of stored fingerprints to the set of comparison fingerprints to identify stored fingerprints matching at least one of the set of comparison fingerprints and, if a match is found, identifying a previous incoming transmission corresponding to a matching stored fingerprint of the set of stored fingerprints;
    storing an indication of a subsequent disposition of the incoming transmission in the hardware implemented mail server;
    receiving at the hardware implemented mail server a subsequent set of comparison fingerprints, the subsequent set of comparison fingerprints indicative of refinements to the known portion of the incoming transmission;
    matching the subsequent set of comparison fingerprints to the stored fingerprints at the hardware implemented mail server;
    determining, based on the matching of the subsequent set of comparison fingerprints, if the subsequent set of comparison fingerprints is indicative of an undesirable portion in the incoming transmission at the hardware implemented mail server;
    selectively performing, based on the determining, a remedial action in response to the subsequent disposition at the hardware implemented mail server;
    wherein the set of comparison fingerprints are virus signatures computed from known undesirable transactions;
    demarcating the incoming transmission into segments at the hardware implemented mail server, each segment operable to yield a fingerprint, wherein the comparing further comprises comparing each value in the set of comparison fingerprints with at least one of the segments at the hardware implemented mail server;
    identifying a segment type of each segment, the segment type corresponding to the content included in the segment;
    categorizing each of the segments according to a heuristic, the heuristic indicative of a likelihood of the categorized segment including an undesirable transmission;
    identifying a risk assessment of each of the segment types; and
    storing the segment according to the identified risk assessment, storing further including identifying a duration.

2. The method of claim 1 wherein storing further comprises selectively storing, if the incoming transmission does not correspond to the set of comparison fingerprints, at least one fingerprint corresponding to the at least one identifiable portion of the incoming transmission.

3. The method of claim 1 wherein computing the fingerprint value includes determining a signature and comparing comprises signature matching.

4. The method of claim 1 further comprising receiving at least one successive set of comparison fingerprints, and iteratively comparing the successive sets of comparison fingerprints to the stored fingerprints, wherein if a match is found, identifying a distribution set of the incoming message corresponding to the matching stored fingerprint and transmitting an indication of the match to the distribution set.

5. The method of claim 1 wherein the subsequent disposition includes transmitting the incoming transmission to a list of successive recipients; and the remedial action is sending a notification to the successive recipients indicative of the matching incoming transmission.

6. The method of claim 1 wherein the incoming transmission further comprises a series of potentially harmful network transmissions, each of the incoming transmission operable to include malicious code, wherein the subsequent disposition includes delivery to at least one successive recipient and remedial action includes determining the successive recipients from the stored successive disposition and notifying each of the successive recipients.

7. The method of claim 1 wherein the determined undesirable portion did not indicate undesirable transmissions based on the comparing of a previous set of comparison fingerprints.

8. The method of claim 1 wherein storing the segments further comprises storing the content of the segment with the corresponding fingerprint.

9. The method of claim 1 wherein the undesirable portions are selected from the group consisting of viruses, worms and Trojan horses included as an attachment according to an established mail protocol.

10. A computer program stored in a computer readable storage medium to execute a method of tracking incoming transmissions, said method comprising the steps of:
    identifying an incoming transmission including at least one identifiable portion;
    computing, for each identifiable portion in the incoming transmission, a fingerprint indicative of the at least one identified portion, the fingerprint being substantially unique to the at least one identified portion;
    storing the computer fingerprint to generate a set of stored fingerprints;
    receiving a set of comparison fingerprints corresponding to known portion of the incoming transmission, the set of comparison fingerprints being predetermined;
    comparing the set of stored fingerprints to the set of comparison fingerprints to identify stored fingerprints matching any of the set of comparison fingerprints and, if a match is found, identifying a previously received incoming transmission corresponding to a matching stored fingerprint of the set of stored fingerprints;
    storing an indication of a subsequent disposition of the incoming transmission;

receiving a subsequent set of comparison fingerprints, the subsequent set of comparison fingerprints indicative of refinements to the known portion of the incoming transmission;

matching the subsequent set of comparison fingerprints to the stored fingerprints;

determining, based on the matching of the subsequent set of comparison fingerprints, if the subsequent set of comparison fingerprints is indicative of an undesirable portion in the incoming transmission;

selectively performing, based on the determining, a remedial action in response to the subsequent disposition;

wherein the set of comparison fingerprints are virus signatures computed from known undesirable transactions;

demarcating the incoming transmission into segments, each segment operable to yield a fingerprint, wherein comparing further comprises comparing each value in the set of comparison fingerprints with at least one of the segments;

identifying a segment type of each segment, the segment type corresponding to the content included in the segment;

categorizing each of the segments according to a heuristic, the heuristic indicative of a likelihood of the categorized segment including an undesirable transmission;

identifying a risk assessment of each of the segment types; and storing the segment according to the identified risk assessment, storing further including identifying a duration.

11. The method of claim 1, wherein the identifying a previous incoming transmission corresponding to a matching stored fingerprint of the set of stored fingerprints is a retroactive analysis of a previously accepted transmission.

* * * * *